United States Patent Office 3,303,211
Patented Feb. 7, 1967

3,303,211
ALKYL-4-HYDROXYPHENYL CARBAMATES
Janet B. Peterson, Yonkers, and Martin Dexter, Briarcliff Manor, N.Y., assignors to Geigy Chemical Corporation, Greenburgh, N.Y., a corporation of Delaware
No Drawing. Filed Sept. 17, 1962, Ser. No. 224,604
7 Claims. (Cl. 260—471)

This invention relates to the stabilization of polypropylene and other unstable organic material with phenols having a carbamate group in particular with stabilizers derived from certain 3-t-lower alkyl-4-hydroxyphenyl carbamates. The invention also relates to a method of preparing stabilized polypropylene and/or other organic material subject to degradation.

More specifically, the invention pertains to stabilization of polypropylene and/or other organic material normally subject to oxidative deterioration with a stabilizer of the Formula I:

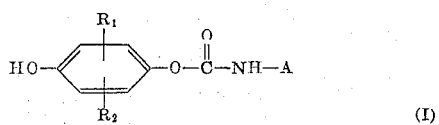

(I)

wherein $R_1$ is an alkyl group, especially 3 to 8 carbon atoms, preferably secondary or a tertiary lower alkyl group, e.g. t-butyl, secondary octyl $R_2$ represents hydrogen or at least one alkyl group—e.g., of from 1 to 8 carbon atoms, preferably a secondary or tertiary alkyl adjacent to OH—but in the case of a tertiary alkyl group it is understood that bulky groups as the tertiary butyl group are not contemplated in positions adjacent to one another in the phenyl nucleus A represents alkyl, lower alkylphenyl and the group

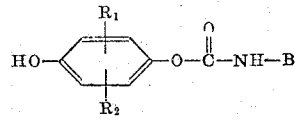

wherein $R_1$ and $R_2$ are the same as above, and
B is a member selected from the group consisting of (a)

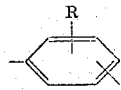

and (b)

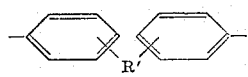

wherein

R is lower alkyl or hydrogen, and
R' is lower alkylene.

In the foregoing Formula I, $R_1$ and R may be methyl, ethyl, propyl, butyl, pentyl, hexyl, $R_2$ may be methyl, ethyl, propyl, butyl, pentyl, hexyl, heptyl, octyl, R' may be methylene, ethylene, propylene, butylene, pentylene, hexylene, A may be alkyl of 1 to 24 carbon atoms, examples of alkyl groups being the same as $R_2$ and also nonyl, decyl, undecyl, dodecyl, tridecyl, tetradecyl, pentadecyl, nonadecyl, eicosyl, docosyl, tricosyl, tetracosyl; examples of lower alkylphenyl are tolyl, ethylphenyl, propylphenyl, butylphenyl, pentylphenyl, hexylphenyl.

It is an object of the invention to provide stable organic material, e.g., stable polyolefinic material, preferably stable polypropylene and polyethylene. Preferably the polyolefins are of high molecular weight, e.g., above 1000 into the hundreds of thousands range. The polyethylenes may be of high density, medium density or low density class.

Polymeric materials such as the foregoing find use as thermoplastic molding or coating agents. Moreover, because of their high dielectric strength and their resistance to water, they are particularly useful as insulators or dielectrics in condensers and other such equipment. It is known that these polyolefins, e.g. polyethylene and polypropylene, are attacked by oxygen, particularly when exposed to the atmosphere and at elevated temperatures. For example, during use or manufacture the desirable properties of the polyolefins may be impaired due to oxidative deterioration. Such degradation causes loss in dielectric properties, discoloration, embrittlement, gelation, etc. Thermal degradation is also checked by the invention.

Not only homopolymeric material, but also copolymers and physical mixtures thereof are stabilized according to the present invention. For example, high impact polystyrene containing copolymers of butadiene and styrene are stabilized according to the invention.

The invention is also useful in stabilizing lubricating oils of various types including aliphatic esters such as, e.g. dihexyl azelate, di-(2-ethylhexyl)azelate, di-(3,5,5-trimethylhexyl)glutarate, di - (3,5,5 - trimethylpentyl)-glutarate, di - (2 - ethylhexyl)pimelate, di - (2 - ethylhexyl)adipate, diisoamyl adipate, triamyl tricarballylate, pentaerythritol tetracaproate, dipropylene glycol dipelargonate, 1,5-pentanediol - di - (2 - ethylhexanoate), etc.

The present invention also relates to the stabilizing of fatty materials including oils of animal and vegetable origin which tend to deteriorate on standing and exposure to atmospheric oxygen. Among the edible fats and oils within the scope of the present invention are: linseed oil, menhaden oil, cod liver oil, castor oil, olive oil, rapeseed oil, coconut oil, palm oil, corn oil, sesame oil, peanut oil, cotton seed oil, butter, fat, lard, beef tallow, etc. Other oils and fats which deteriorate on standing and exposure to oxygen in the air or oxygen at elevated temperatures are all within the scope of the present invention.

Within the scope of the invention also are saturated and unsaturated hydrocarbons which tend to deteriorate on storage such as, e.g., gasolines, both natural and synthetic, in particular, saturated and unsaturated gasolines, etc.; jet fuel; diesel oil; mineral oil; fuel oil; drying oil; waxes; resins; etc. Such hydrocarbons are protected against gum formation, discoloration and other deterioration with the stabilizers of the present invention.

It is furthermore an object of the present invention to provide novel substituted stabilizers of the Formula I which are versatile and effective stabilizers in at least a single class of the foregoing organic materials which are normally subject to deterioration caused by exposure to light and/or heat and/or oxygen, etc.

Particularly preferred stabilizers of the invention are 3-t-butyl-4-hydroxyphenyl N-(n-octadecyl) carbamate and 2 - t - butyl-4-hydroxyphenyl N-(n-octadecyl) carbamate which are especially useful in stabilizing polyolefinic material, e.g. polypropylene and polyethylene.

It is understood that the stabilizers of the invention are not necessarily of equivalent potency. The specific stabilizer most useful to a given unstable material will depend upon several factors for its advantages. Availability and cost of raw materials for the manufacture of the stabilizer and effective inhibitory action of the stabilizer including duration and degree of activity are among the factors which control the choice of a specific stabilizer for a specific substrate which is normally subject to deterioration. Toxicity, color, stability to light and/or heat and solubility are also important factors.

In general, stabilizers of the invention are employed in a concentration of from about 0.001% to about 5% by weight, preferably from about 0.01% to about 1% by weight. The specific concentration used varies with the substrate and the stabilizer, but the following ranges are preferred.

Concentrations of about 0.001% to about 1% by weight for the stabilizer in polyethylene are useful. In polypropylene from about 0.05% to about 1% by weight of stabilizer is especially useful. In mineral oils, concentrations of from about 0.005% to about 1% by weight of stabilizer are used. Gasolines are stabilized with from about 0.001% to about 0.1% by weight of stabilizer, preferably about 0.05% by weight. Fatty material of animal origin such as lard is stabilized with from about 0.001% to about 0.1% by weight of stabilizer. Oils of vegetable origin such as cotton seed oil are similarly stabilized with from about 0.001% to about 0.1% by weight of stabilizer.

Hydrocarbon material such as cycloolefins, e.g. cyclohexene, is advantageously stabilized with from about 0.001% to about 1% by weight of the stabilizers of the present invention. Similar concentrations of stabilizer are used to stabilize aldehydes such as, e.g., about 0.01% by weight in heptaldehyde. High temperature lubricants which are essentially synthetic esters of alkanoic acids, e.g. trimethylol propane tripelargonate, and diisoamyladipate, are stabilized with from about 0.5% to about 5%, preferably about 2%, by weight of a stabilizer according to the invention.

The compounds of this invention may be used also to stabilize organic material in combination with other additive agents such as, e.g., antioxidants, pourpoint depressants, corrosion and rust inhibitors, dispersing agents, demulsifiers, antifoaming agents, carbon black, accelerators and other chemicals used in rubber compounding, plasticizers, color stabilizers, heat stabilizers, ultraviolet absorbers, dyes, pigments, metal chelating agents, etc.

A particularly useful stabilizer system in some cases comprises a stabilizer of the Formula I and di-lauryl-beta-thio-di-propionate (hereinafter referred to as DLTDP). Generally from about 0.005% to about 10% (based on the stabilized composition) by weight of DLTDP and other stabilizers, e.g. of the Formula I, are employed. Polypropylene is advantageously stabilized with about 0.1% to 0.5% by weight of DLTDP and 0.1% to 0.5% by weight of a stabilizer of the Formula I.

In place of DLTDP, other similar diesters are usefully employed with the stabilizers of the Formula I for stabilization of organic material, e.g., polypropylene. Such diesters as the following are useful:

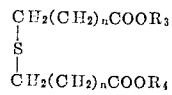

wherein $n$ is a small number, e.g. 1 or 2; and $R_3$ and $R_4$ are each independently an alkyl group, e.g. having 8 to 24 carbon atoms, such as octyl, nonyl, decyl undecyl, dodecyl, tridecyl, tetradecyl, pentadecyl, hexadecyl, heptadecyl, octadecyl, eicosyl, heneicosyl, tricosyl, tetracosyl.

The stabilizer compounds of the Formula I are prepared by reaction of the appropriate alkylhydroquinone compound with the appropriate isocyanate to form the desired alkylhydroxyphenyl N-substituted carbamate.

The following examples are illustrative of the invention only, and there is no intention to limit the scope of the invention thereto. In the following examples parts are by weight, unless otherwise specified, and temperature is in degress centigrade. The relationship between parts by weight and parts by volume is as that of grams to cubic centimeters.

EXAMPLE 1

3,5-di-t-butyl-4-hydroxyphenyl N-(n-octadecyl)carbamate n-Octadecyl isocyanate (8.88 parts), 6.66 parts of 2,6-di-t-butyl-1,4-hydroquinone, 35 parts of n-hexane and 5 drops of pyridine are refluxed together for 2 hours. The solution is cooled and allowed to stand at room temperature, and a small amount of insoluble material is filtered off. The filtrate is distilled in vacuo to remove the hexane and the waxy residue is broken up and slurried in methanol. The white, crystalline solid is filtered, washed with methanol, and dried, and 11.3 parts are recrystallized from a mixture of methanol and a small amount of petroleum ether. In this manner, 9.5 parts of 3,5-di-t-butyl-4-hydroxyphenyl N-(n-octadecyl)carbamate are obtained as a white, crystalline powder, M.P. 50–51°.

Analysis.—Calculated for $C_{33}H_{59}O_3N$: C, 76.54%; H, 11.49%; N, 2.71%. Found: C, 76.42%; H, 11.62%; N, 3.00%.

In a similar manner by using 2,6-di-t-octyl-1,4-hydroquinone, then 3,5-di-t-octyl-4-hydroxyphenyl N-(n-octadecyl) carbamate is obtained.

EXAMPLE 2

3-t-butyl-4-hydroxyphenyl N - (n - octadecyl)carbamate-(a) and 2 - t-butyl-4-hydroxyphenyl N-(n - octadecyl) carbamate(b)

(a) n-Octadecyl isocyanate (8.88 parts), 4.98 parts of 2-t-butyl-1,4-hydroquinone, 50 parts of dioxane and 6 drops of pyridine are refluxed together for 4 hours. The solution is cooled and allowed to stand at room temperature and a small amount of insoluble material is filtered off. The filtrate is evaporated to dryness in vacuo, and the solidified residue (15.5 parts) is taken up in 20 parts of methanol. The methanol slurry is cooled in an ice-water bath, filtered and triturated and washed several times with cold methanol. The methanol filtrate and washes are combined and saved. The dried solid (3.5 parts) is recrystallized from a mixture of petroleum ether and n-hexane (2:1 by volume), and 1.8 parts of 3-t-butyl-4-hydroxyphenyl N-(n-octadecyl)carbamate are obtained as a white, crystalline powder, M.P. 88–93°.

Analysis.—Calculated for $C_{29}H_{51}O_3N$: C, 75.44%; H, 11.13%; N, 3.03%. Found: C, 75.41%; H, 11.17%; N, 2.79%.

(b) The methanol is removed in vacuo from the combined filtrate and washings which had been saved [see above (a)], and the crystalline residue (8 parts) is triturated, filtered and washed with petroleum ether. The solid (2.5 parts) is recrystallized from a mixture of petroleum ether and n-hexane (3:1 by volume) and 2 parts of 2-t-butyl-4-hydroxyphenyl N-(n-octadecyl)carbamate are obtained as a white, crystalline powder, M.P. 75–79.5°.

Analysis.—Calculated for $C_{29}H_{51}O_3N$: C, 75.44%; H, 11.13%; N, 3.03%. Found: C, 75.41%; H, 11.05%; N, 2.96%.

EXAMPLE 3

Di(3,5-di-t-butyl-4-hydroxyphenyl)N,N'-(4-methyl-1,3-phenylene)dicarbamate 4-methyl-m-phenylenediisocyanate (3.48 parts), 9 parts 2,6-di-t-butyl-1,4-hydroquinone, 35 parts of n-hexane and 5 drops of pyridine are refluxed together for ½ hour. The solution is cooled to room temperature and a small amount of insoluble material is filtered off. The filtrate, from which the product tends to oil out, is diluted somewhat with n-hexane and a few parts of benzene, heated to boiling, then cooled, the supernatant solution poured off, and the residual syrup taken up in 25–35 parts of benzene. The mixture is warmed to effect complete solution and the product is reprecipitated by the addition of petroleum ether. The finely divided solid is filtered, washed with petroleum ether, and dried, and 6 parts are recrystallized from a mixture of hexane and ethyl acetate (7:1 by volume). After a long period of standing, 1.5 parts of di(3,5-di-t-butyl-4-hydroxyphenyl)N,N'-(4 - methyl - 1,3-phenylene)dicarbamate are obtained as white crystals, M.P. 135–141°.

*Analysis.*—Calculated for $C_{37}H_{50}O_6N_2$: C, 71.81%; H, 8.15%; N, 4.53%. Found: C, 71.94%; H, 7.95%; N, 4.93%.

EXAMPLE 4

*Di(3,5-di-t-butyl-4-hydroxyphenyl)methylene-N,N'-(di-p,p'-phenylene)dicarbamate*

Methylene-p-phenylene diisocyanate (5.01 parts), 8.88 parts of 2,6-di-t-butyl-1,4-hydroquinone, 55 parts of benzene and 5 drops of pyridene are refluxed together for 3¼ hours. The clear solution is cooled slowly to room temperature and allowed to stand overnight. The precipitated white, crystalline solid is filtered, washed with benzene, and dried. In this way, 13.5 parts of di(3,5-di-t-butyl-4-hydroxyphenyl)methylene-N,N'-(di - p,p'-phenylene)dicarbamate are obtained, M.P. 176–177.5°.

*Analysis.*—Calculated for $C_{43}H_{54}O_6N_2$: C, 74.32%; H, 7.83%; N, 4.03%. Found: C, 74.33%; H, 8.06%; N, 4.33%.

EXAMPLE 5

*3,5-di-t-butyl-4-hydroxyphenyl N-(o-tolyl)carbamate* o-Tolyl isocyanate (5.32 parts), 8.88 parts of 2,6-di-t-butyl-1,4-hydroquinone, 35 parts of n-hexane and 8 drops of pyridine are refluxed together for ½ hour. The reaction mixture is cooled and allowed to stand at room temperature, and the product which has crystallized from the solution during this time is filtered, washed well with n-hexane, and dried. In this way, 11 parts of white, crystalline 3,5-di-t-butyl-4-hydroxyphenyl N-(o-tolyl)carbamate are obtained, M.P. 146–147.5°.

*Analysis.*—Calculated for $C_{22}H_{29}O_3N$: C, 74.33%; H, 8.22%; N, 3.94%. Found: C, 74.37%; H, 8.25%; N, 3.88%.

EXAMPLE 6

*Stabilization of polypropylene*

Unstabilized polypropylene powder (Hercules PRO-FAX 6501) is thoroughly blended with 0.5% by weight of 3-t-butyl-4-hydroxyphenyl N-(n-octadecyl)carbamate. The blended material is then milled on a two roller mill at 182° for 5 minutes, after which time the stabilized polypropylene is sheeted from the mill and allowed to cool.

The milled polypropylene sheet is then cut into small pieces and pressed for 7 minutes on a hydraulic press at 218° and 2000 pounds per square inch pressure. The resultant sheet of 25 mil thickness is then tested for resistance to accelerated aging in a forced draft oven at 149°. The resultant composition of 0.5% by weight of 3-t-butyl-4-hydroxyphenyl N-(n-octadecyl)carbamate and polypropylene is stabilized against oxidative deterioration for more than 500 hours. The unstabilized polypropylene deteriorates after only 3 hours.

In like manner as in this example, stabilized compositions of polypropylene are prepared having 0.5% by weight of each of the following:

3,5-di-t-butyl-4-hydroxyphenyl N-(n-octadecyl)carbamate
2-t-butyl-4-hydroxyphenyl N-(n-octadecyl)carbamate
Di(3,5-di-t-butyl-4-hydroxyphenyl)N,N'-(4-methyl-1,3-phenylene)dicarbamate
Di(3,5-di-t-butyl-4-hydroxyphenyl)methylene-N,N'-(di-p,p'-phenylene)dicarbamate
3,5-di-t-butyl-4-hydroxyphenyl N-(o-tolyl)carbamate.

*Stabilization of polypropylene*

In a similar manner as in this example, stable compositions of polypropylene are prepared with 0.1% by weight of a compound according to each of the preceding examples in Part II, together with 0.5% by weight of di-lauryl-p-thiodipropionate. In some cases the improvement is so remarkable that a synergistic effect is observed in the oven-aging test.

What is claimed is:

1. The compound of the formula:

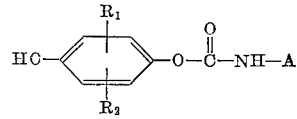

wherein
$R_1$ is an alkyl group having 3 to 8 carbon atoms,
$R_2$ is a member selected from the group consisting of hydrogen and an alkyl group having 1 to 8 carbon atoms,
A is a member selected from the group consisting of alkyl having 1 to 24 carbon atoms, lower alkylphenyl, and the radical of the formula

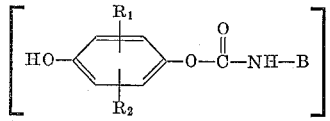

wherein
$R_1$ and $R_2$ are the same as above, and
B is a member selected from the group consisting of (a) 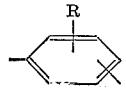

and (b) 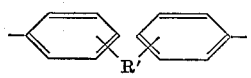

wherein
R is a member selected from the group consisting of lower alkyl and hydrogen, and
R' is lower alkylene.

2. 3,5-di-t-butyl - 4 - hydroxyphenyl N - (n-octadecyl) carbamate.

3. 3 - t - butyl-4-hydroxyphenyl N-(n-octadecyl)carbamate.

4. 2 - t - butyl - 4-hydroxyphenyl N-(n-octadecyl)carbamate.

5. Di(3,5-di-t-butyl-4-hydroxyphenyl)N,N'-(4-methyl-1,3-phenylene)dicarbamate.

6. Di(3,5-di-t-butyl-4-hydroxyphenyl)methylene N,N'-(di-p,p'-phenylene)dicarbamate.

7. 3,5-di-t-butyl-4-hydroxyphenyl N-(o - tolyl)carbamate.

References Cited by the Examiner

UNITED STATES PATENTS

| | | | |
|---|---|---|---|
| Re. 24,868 | 9/1960 | Beaver et al. | 260—471 |
| 2,677,698 | 5/1954 | Deutschman | 260—471 |
| 2,980,648 | 4/1961 | Bill et al. | 260—45.85 |
| 2,983,709 | 5/1961 | Newland et al. | 260—45.85 |
| 3,081,335 | 3/1963 | Morris et al. | 260—471 |

LORRAINE A. WEINBERGER, *Primary Examiner.*

WILLIAM H. SHORT, *Examiner.*

H. E. TAYLOR, V. GARNER, *Assistant Examiners.*